US008458092B2

(12) United States Patent
Ward et al.

(10) Patent No.: US 8,458,092 B2
(45) Date of Patent: Jun. 4, 2013

(54) TECHNIQUES FOR TRANSACTION ADJUSTMENT

(75) Inventors: Michael C Ward, Northants (GB);
Alexandru Cunescu, Brussels (BE);
David A Roberts, Warrington (GB);
David Bibby, Brussels (BE)

(73) Assignee: Mastercard International Incorporated Purchase, New York ( * ) Notice: Subject to any disclaimer, the term of this patent is extended or adjusted under 35 U.S.C. 154(b) by 0 days.

(21) Appl. No.: 13/304,589

(22) Filed: Nov. 25, 2011

(65) Prior Publication Data

US 2012/0072344 A1    Mar. 22, 2012

Related U.S. Application Data

(62) Division of application No. 11/684,226, filed on Mar. 9, 2007, now Pat. No. 8,090,654.

(60) Provisional application No. 60/783,568, filed on Mar. 17, 2006.

(51) Int. Cl.
*G06Q 40/00*    (2012.01)

(52) U.S. Cl.
USPC .............................. 705/40; 705/35

(58) Field of Classification Search
USPC .......................................................... 705/40
See application file for complete search history.

(56) References Cited

U.S. PATENT DOCUMENTS

| | | | |
|---|---|---|---|
| 5,055,657 A | | 10/1991 | Miller et al. |
| 5,650,606 A | * | 7/1997 | Baus, Jr. .................... 235/449 |
| 6,038,551 A | * | 3/2000 | Barlow et al. ............... 705/41 |
| 6,546,373 B1 | | 4/2003 | Cerra |
| 7,076,329 B1 | * | 7/2006 | Kolls ........................... 700/232 |
| 2002/0046092 A1 | | 4/2002 | Ostroff |
| 2002/0074401 A1 | * | 6/2002 | Madani ......................... 235/449 |
| 2003/0034389 A1 | | 2/2003 | Cantini et al. |
| 2003/0080186 A1 | | 5/2003 | McDonald et al. |
| 2003/0097402 A1 | | 5/2003 | Vindeby |
| 2003/0163424 A1 | | 8/2003 | Kumamoto |
| 2003/0212796 A1 | | 11/2003 | Willard |
| 2007/0130087 A1 | * | 6/2007 | Adamson ..................... 705/77 |
| 2007/0271179 A1 | * | 11/2007 | Kubota ......................... 705/39 |

OTHER PUBLICATIONS

Coyle-Camp, Elizabeth M. "Savings in the cards"; Jul. 1994, v12n8, pp. 5-9. ISSN: 0263-2772.*
Debit Card News, "Chicago Transit Authority Switches to the Prepaid Fare Card Line". Jun. 30, 1997, v3, n1, p5+, Newsletter.*
Lee, Dong Hwan. "Consumers' Experiences, opinions, attitudes, satisfaction, dissatisfaction, and complaining behavior with vending machines"; 2003, v16, pp. 178-197, ISSN: 0899-8620.*
Computers in Libraries, "Maxell Corp. offers new Smart Cash Card," Apr. 2003, 23, ISSN: 1041-7915.
Matsumoto, Janice, "Money Machines," May 1, 1999, ISSN: 0273-5520.
Whitman, Stephanie, "Florida State University's prepaid/debit card piques . . . " EFT report, v14, Jun. 10, 1991, ISSN: 0195-7287.
ISA/US, International Search Report, PCT/US07/63932, Oct. 23, 2007.

\* cited by examiner

*Primary Examiner* — Lalita M Hamilton
*Assistant Examiner* — Edward Chang
(74) *Attorney, Agent, or Firm* — Otterstedt, Ellenbogen & Kammer, LLP

(57) ABSTRACT

Techniques are provided for transaction adjustment. A payment device, having an offline balance, is presented to an offline terminal in connection with a putative transaction. If an irregularity with the putative transaction is detected, the offline balance is adjusted responsive to the detection. In one aspect of the invention, such adjustment can be carried out, via offline-terminal interaction, substantially without the use of a security module and cryptographic keys in the offline terminal.

9 Claims, 5 Drawing Sheets

TECHNIQUES FOR TRANSACTION ADJUSTMENT

CROSS-REFERENCE TO RELATED APPLICATIONS

This patent application is a divisional of U.S. patent application Ser. No. 11/684,226, filed Mar. 9, 2007, now U.S. Pat. No. 8,090,654 entitled "TECHNIQUES FOR TRANSACTION ADJUSTMENT," which in turn claims the benefit of U.S. Provisional Patent Application Ser. No. 60/783,568 filed on Mar. 17, 2006, and entitled "Techniques for Transaction Adjustment." The disclosure of the aforementioned U.S. patent application Ser. No. 11/684,226 and the disclosure of the aforementioned Provisional Patent Application Ser. No. 60/783,568 are expressly incorporated herein by reference in their entireties for all purposes.

FIELD OF THE INVENTION

The present invention generally relates to techniques for financial transactions and, more particularly, to techniques associated with transactions conducted with payment devices such as "smart" credit and/or debit cards.

BACKGROUND OF THE INVENTION

Cards and other devices for performing financial transactions may operate in online or offline modes. In an online mode, communication is established with a host computer of an issuer to ensure, for example, that sufficient funds are available for a transaction, that a card or other payment device has not been reported as lost or stolen, and so on. Online transactions have the advantage of potentially greater security, protecting the cardholder and the merchant from loss, theft, insufficient funds, and the like. However, they may be relatively slow and/or inconvenient, and may therefore be avoided by cardholders, especially for lower value transactions.

U.S. Patent Application Publication 2003-0163424 of Kumamoto discloses an electronic money transaction processing system. The system generates electronic money data which corresponds to a refund amount in response to a refund request from a user, and transmits this electronic money data directly to an IC card. Therefore, the user is able to instantly receive the refund amount as electronic money and, because the user is relieved of the task of paying electronic money from his or her own banking facility account to the IC card, user convenience is improved. An operator inputs past transaction data which is to be the subject of a refund via an input unit of an electronic money terminal and in accordance with a receipt. Then, the electronic money terminal connects to the server so as to be capable of communicating therewith (on-line) to thereby transmit a refund request which includes the inputted transaction data (input data) and the refund request amount to the server.

U.S. Pat. No. 5,055,657 of Miller et al. discloses a vending type machine dispensing a redeemable credit voucher upon payment interrupt. The machine has a computer that is connected via a data communication line with a central computer located in a central office. In order, despite the absence of an intermediate cash box for bills received during an interrupted payment process, to be able to protect against fraudulent refunds for equivalent values on vouchers issued by such machines, a plain language as well as machine-readable coded data entry is printed on the voucher, with this data entry, in addition to the value of the bill, also containing the location indication of the particular machine, and the actual date and time in seconds. This data entry is entered in a data-protected memory of the machine, and is entered via the data communication line in a data-protected memory of the central computer. Upon redemption of the voucher at the central office, the coded data entry is read and this is compared with the data stored in the memory of the central computer prior to paying out the equivalent value.

In an offline mode, a transaction can proceed without establishing communication with a remote host. Cards or other payment devices may be provided that function in an exclusively offline mode, an exclusively online mode, or in both offline and online modes. So-called "smart" cards, containing integrated circuit (IC) chips can be used for electronic payments, and may offer an "offline balance" that might be used by a cardholder to monitor available funds for offline spending. Offline spending may be convenient for low value transactions and at remote locations where connection to a remote host is not possible. One example is that of parking meters. Another is that of vending machines.

Currently, when a transaction takes place, the offline balance is reduced by the value of the transaction. However, if a mistake has been made (for example, the vend fails in a vending machine, and a refund is needed) there is currently no way to correct the offline balance of the card or other device.

Accordingly, a need exists for a way to adjust a transaction (e.g., to reverse the transaction in the case of a failed vend), which will maintain a correct offline balance (e.g., the balance is not reduced in the case where a transaction is reversed or aborted). It would also be desirable if such techniques for transaction adjustment could be developed to function in a simple yet secure fashion.

SUMMARY OF THE INVENTION

Principles of the present invention provide techniques for transaction adjustment in cards or other payment devices. An exemplary embodiment of a method (which can be computer-implemented), according to one aspect of the invention, includes the steps of facilitating presentation of a payment device having an offline balance to an offline terminal in connection with a putative transaction, facilitating detection of an irregularity with the putative transaction, and adjusting the offline balance responsive to the detection of the irregularity. In one aspect of the invention, such adjustment can be carried out, via offline-terminal interaction, substantially without the use of a security module and cryptographic keys in the offline terminal (though such module and keys may be present for other purposes).

In one specific exemplary approach, a terminal transforms a substantially unpredictable source number in accordance with a non-invertable transformation scheme and sends the terminal-transformed number to the card or other payment device. If an irregularity is detected, the terminal sends the source number to the payment device, which transforms the source number according to the non-invertable transformation scheme to obtain a payment-device-transformed number. If the payment-device-transformed number substantially matches the terminal-transformed number, the offline balance can be adjusted, for example, by not debiting a charge where a vend has failed.

In another exemplary approach, applicable, for example, to pre-existing systems where terminals and cards or other payment devices are configured to exchange on-line message requests and transaction confirmation requests, transactions with no irregularities are completed by first exchanging the on-line message request, followed by the transaction confirmation request. When an irregularity is detected, the terminal does not send the transaction confirmation request to the card or other payment device, such that the putative transaction is not completed in the case of an irregularity.

An exemplary embodiment of a payment device (such as a card), according to another aspect of the invention, can include a body portion, a memory associated with the body portion, and at least one processor associated with the body portion and coupled to the memory. The processor can be operative to perform one or more of the method steps described herein. Further, an exemplary embodiment of terminal apparatus for interacting with a payment device of the kind described, according to still another aspect of the invention, can include a reader module, a memory associated with the reader module, and at least one processor coupled to the memory. The processor can be operative to perform one or more of the method steps described herein. One or more method steps of the present invention can be implemented in the form of an article of manufacture comprising a machine readable medium that contains one or more programs which when executed implement the one or more method steps described herein.

Techniques of the present invention can provide substantial beneficial technical effects. These can include, for example, the ability to reverse or adjust the transaction in a secure manner without the use of a security module and cryptographic keys in an offline terminal. This, in turn, can reduce or eliminate the need for complex installations in remote locations such as parking meters, vending machines, and the like.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
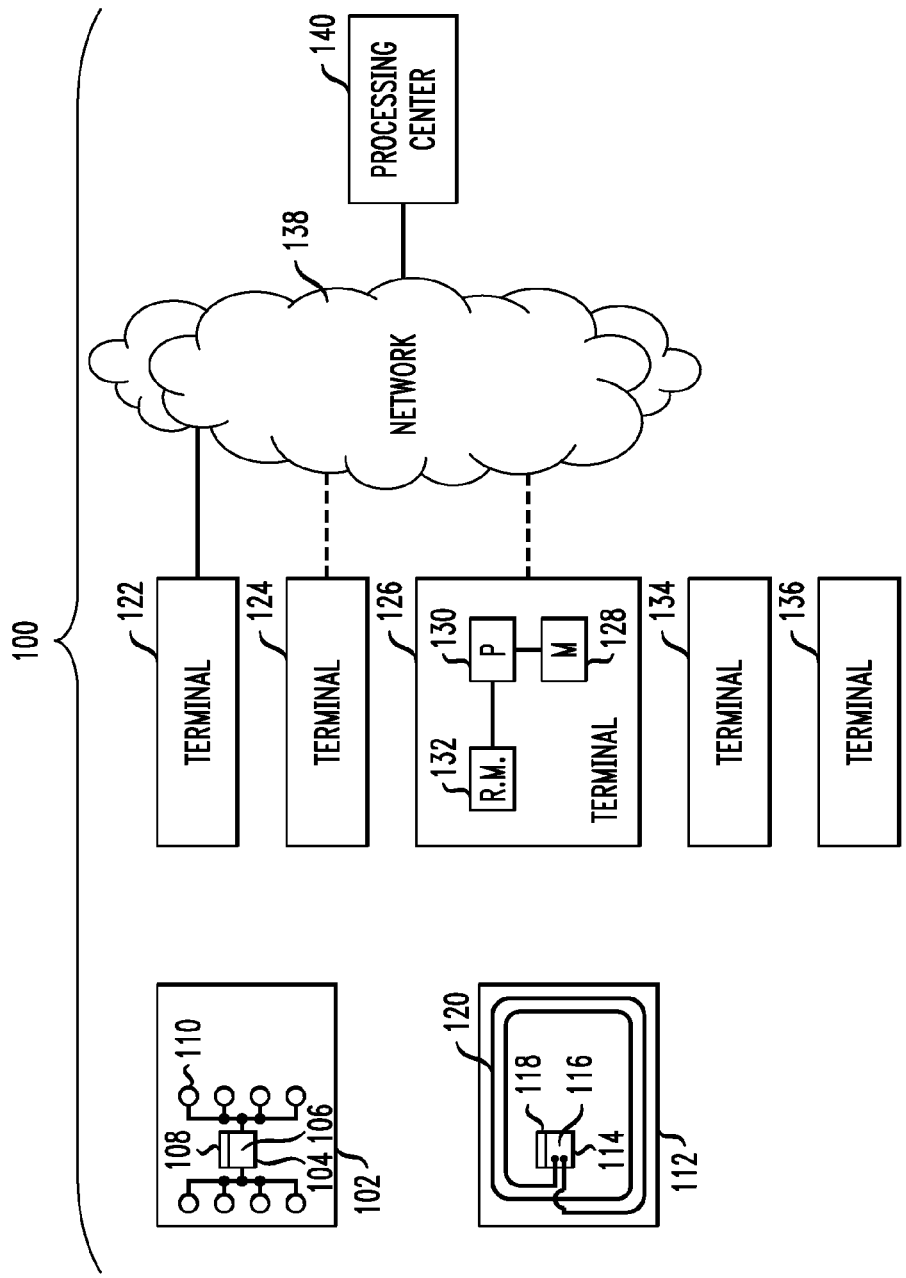
FIG. 1 shows an exemplary embodiment of a payment system according to an aspect of the present invention.

Attention should now be given to FIG. 1, which depicts an exemplary embodiment of a payment system 100, according to an aspect of the present invention, and including various possible components of the system. System 100 can be designed, for example, to work with a contact payment device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless payment device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of payment devices that can be employed with techniques of the present invention.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms (note that in some forms of the present invention, adjusting of the offline balance can be carried out substantially without the use of a security module and cryptographic keys in the offline terminal, but card cryptographic capability may be required for other purposes).

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS™ operating system licensed by StepNexus Inc. Alternatively, Java Card-based operating systems, based on Java Card technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications, for example, an online-capable application, such a as debit and/or credit payment application, and a primarily offline application, such as an offline payment application. At present, one preferred standard to which such applications may conform is the EMV payment standard set forth by EMV Co. LLC (http://www.emvco.com). Reference can be had, for example, to the well-known and publicly available "EMV Integrated Circuit Card Specifications for Payment Systems" Version 4.1 of May 2004. It will be appreciated that, strictly speaking, the EMV standard defines the behavior of a terminal; however, the card can be configured to conform to such EMV-compliant terminal behavior and in such a sense is itself EMV-compliant. It will also be appreciated that applications in accordance with the present invention can be configured in a variety of different ways.

It will be appreciated that, as noted, cards 102, 112 are examples of a variety of payment apparatuses that can be employed with techniques of the present invention. Such devices could include cards having a conventional form factor, smaller or larger cards, cards of different shape, key fobs, personal digital assistants (PDAs), or indeed any device with the processing and memory capabilities to implement techniques of the present invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain online-capable applications and/or primarily offline applications, which can have one or more offline parameters. The processors 106, 116 can be operative to execute one or more method steps to be described herein. The applications can be, for example, application identifiers (AIDs) linked to software code in the form of firmware plus data in a card memory such as an electrically erasable programmable read-only memory (EEPROM).

System 100 can also include one or more different types of terminals 122, 124, 126, 134, 136. Some terminals, such as 122, may be permanently coupled to a computer network 138, as indicated by the solid interconnecting line. Other terminals, such as 124 and 126, may be amenable to being coupled to the computer network 138 under some conditions but not others, as indicated by the dotted interconnecting lines. Still other terminals 134, 136 may be stand-alone, and not connected to the computer network 138. These can include, for example, parking meters, vending machines, and the like. Any of the terminals can be configured to interact with offline applications, while the terminals capable of connection with network 138 might also be capable of interaction with online applications. The techniques of the present invention are believed to be particularly advantageous for transaction adjustment in offline situations, when interconnection with network 138 is impossible or would be inconvenient or where the cost of managing the transaction would be prohibitive for the value of the transaction.

Terminal 126 will be described in greater detail for illustrative purposes, and the general principles of construction of terminal 126 are applicable to other types of terminals. Terminal 126 can include a memory 128, a processor portion 130, and a reader module 132. Reader module 132 can be configured for contact communication with card 102, or contactless communication with card 112, or both (different types of readers can be provided to interact with different types of cards, e.g., contacted or contactless). Computer network 138, could be, for example, the Internet, or a proprietary network, and could provide connection to a processing center 140 which could include a host computer of a card issuer.

Note that cards or other payment devices for use with the present invention could employ multiple IC chips. For example, one might use a contact chip for debit applications and a contactless chip for offline spending. Appropriate communication could be provided between the chips in this case. A single chip could also be configured for both contacted and contactless communications. It should be noted that techniques of the present invention are applicable to offline-only cards or devices, or cards or devices having both offline and online capability.

An exemplary embodiment of terminal apparatus for interacting with a payment device of the kind described herein, can include a reader module such as 132, a memory 128 associated with the reader module 132, and at least one processor 130 coupled to the memory 128. The processor 130 can be operative to perform one or more of the method steps described herein. The terminal apparatus can be stand alone, or can be coupled permanently or intermittently to the processing center 140 via the network 138. Other types of readers and/or terminals could be employed, such as automated teller machines (ATMs) modified in accordance with the principles of the present invention.

Figure 2:
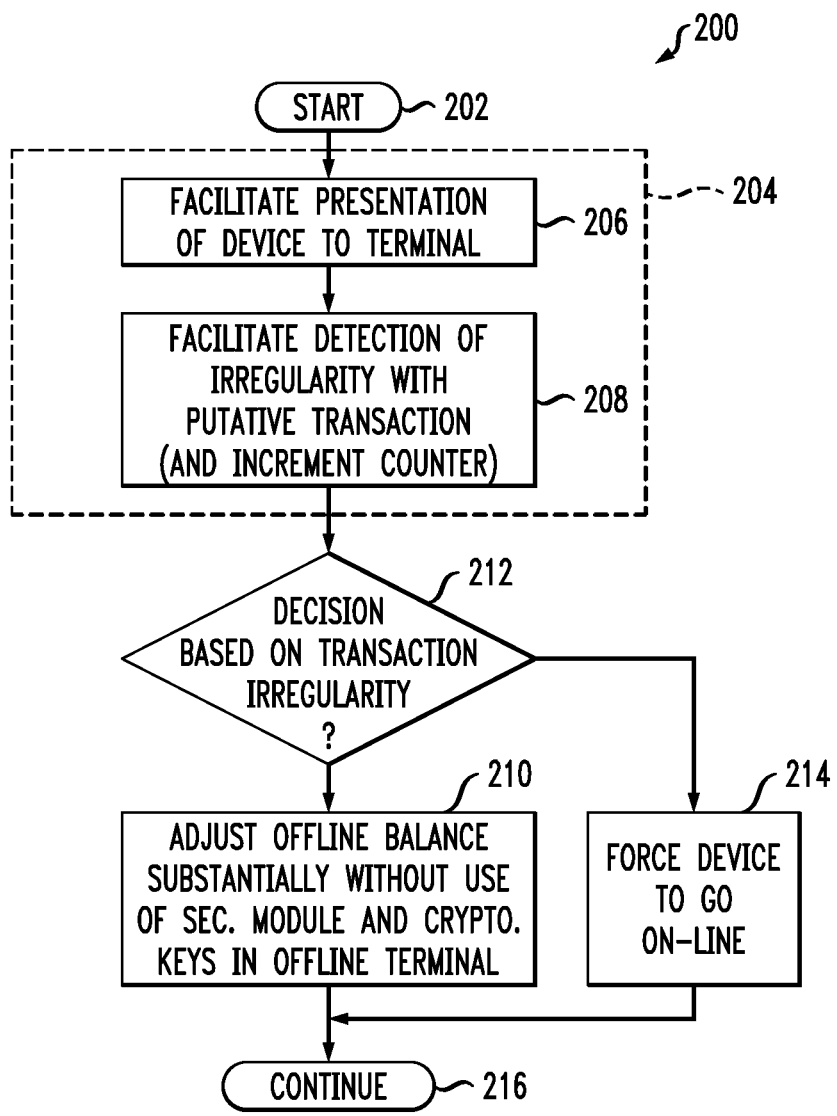
FIG. 2 presents a flow chart of an exemplary method for transaction adjustment according to another aspect of the present invention.

FIG. 2 shows a flow chart 200 of steps in an exemplary method, which can be computer-implemented, for transaction adjustment. After starting at block 202, the method can include the step, shown at 204, of facilitating detection of an irregularity with a putative transaction between a payment device having an offline balance, and an offline terminal, and as shown at step 210, adjusting the offline balance responsive to the detection of the irregularity. As used herein, "facilitating" an action includes performing the action, making the action easier, helping to carry the action out, or causing the action to be performed. In some forms of the invention, the aforementioned adjusting of the offline balance can be carried out, via offline-terminal interaction, substantially without the use of a security module and cryptographic keys in the offline terminal (such module and/or keys might be present for other purposes as discussed further hereinafter). The payment device used to carry out the method can be, for example, a "smart" or chip card conforming to the aforementioned EMV standard. The adjustment of the offline balance could be, for example, re-crediting a vend value in the case of a failed vend in a vending machine. The offline-terminal interaction can typically be with the same offline terminal with which the putative transaction was carried out. In some instances, such as the "hash method" discussed herein, the transaction adjustment (e.g., reversal) can happen in a subsequent transaction. Such subsequent transaction could also typically be with the same offline terminal. However, it is possible that the subsequent transaction could be with another offline terminal. For example, the acquirer or their agent might transfer the pre-hash unpredictable number (UN) (discussed below) to another special offline terminal or other device dedicated to reversals and that the transaction could then be reversed from that terminal or other device, as well as the same terminal.

Step 204 could be accomplished, for example, by carrying out steps 206 and 208. Step 206 involves facilitating presentation of a payment device having an offline balance to an offline terminal in connection with a putative transaction. Step 208 includes facilitating detection of an irregularity with the putative transaction. Again, by way of example, the putative transaction could be an attempt to purchase a soda from a vending machine, and the irregularity that was detected could be a failure of the soda to vend.

As shown in step 208, optionally, appropriate action could be taken to detect a number of instances of putative transactions having irregularities. For example, a counter could be incremented whenever an irregularity was detected, or other suitable techniques could be employed. As shown at optional block 212, a decision can be made based on transaction irregularity. For example, if the counter was greater than or equal to a predetermined value, one could force the card or other payment device to go online as at block 214. If too many irregular transactions had not occurred, one could proceed to the aforementioned block 210. With regard to certain particular examples set forth hereinafter, in the method of FIG. 3, the counter can be adjusted if an irregularity is detected (i.e. cancellation if vend fails) whereas with the method of FIG. 5, the counter can be adjusted if an irregularity is not detected (i.e. successful vend causes balance to be decremented).

As indicated at block 216, a pass through the flow chart is complete once the offline balance has been adjusted or a decision has been made to force the device to go online. Of course, processing can continue when the same or other device(s) are presented to the same or different terminal(s).

Figure 3:
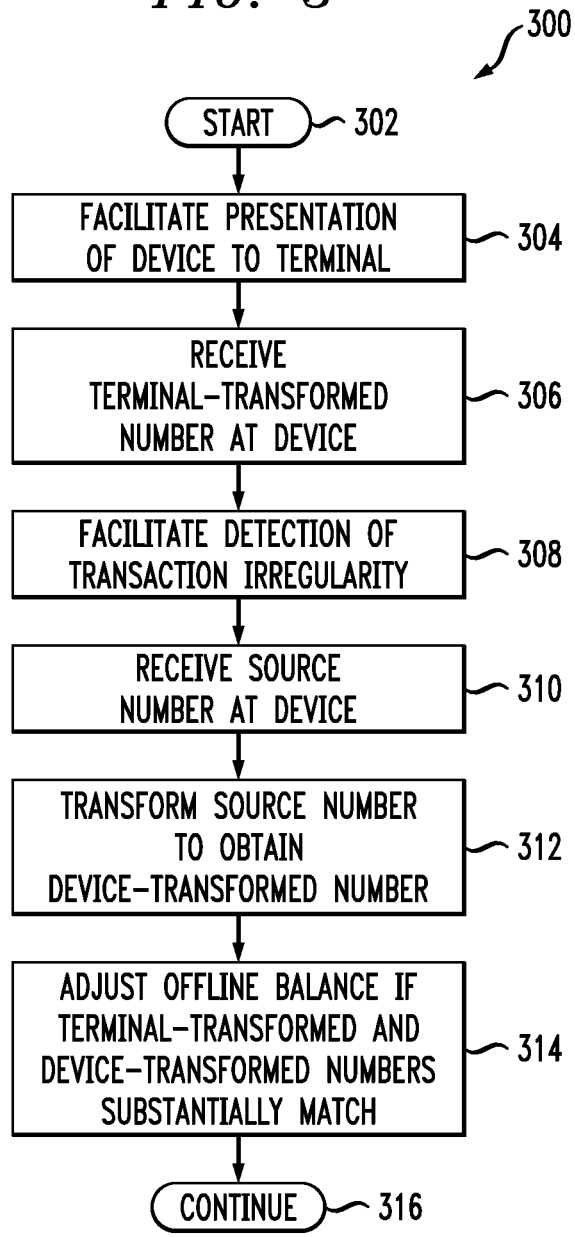
FIG. 3 shows a flow chart of one possible detailed approach to transaction adjustment, viewed from the card or payment device side.

FIG. 3 shows a flow chart 300 with detailed method steps for transaction adjustment, according to one preferred form of the present invention, viewed from the perspective of a card or other payment device. The exemplary method depicted in FIG. 3 can also be referred to as a "Hash Method." After starting at step 302, presentation of a payment device to a terminal is facilitated at step 304. The payment device has an offline balance and the terminal is an offline terminal (either not connected to a network at all, not currently connected to a network, or does not wish to access the network for the current transaction (e.g., in the case of a low value transaction where speed is of the essence or where costs must be kept low to be able to accept low value payments)). The presentation of the device to the terminal is in connection with a putative transaction. At block 306, a terminal-transformed number is received at the payment device. The terminal-transformed number is a substantially unpredictable source number that is transformed in accordance with a non-invertable transformation scheme. At step 308, detection of an irregularity with the putative transaction is facilitated. Then, at steps 310, 312 and 314, the offline balance is adjusted, responsive to the detection of the irregularity. At block 310, the source number that was used to generate the terminal transformed number is received at the device. At block 312, the device transforms the source number according to the non-invertable transformation scheme in order to obtain a payment-device-transformed number. At block 314, the terminal-transformed number and the device-transformed number are compared and if they substantially match, the offline balance is adjusted responsive to the match. The process continues at block 316, which represents a pass through the flow chart, but it is understood that one or more of the steps can be repeated when the card or other device is presented to the same terminal or a different terminal. It will be appreciated that the flow chart of FIG. 3 represents one specific manner in which certain steps depicted in the flow chart of FIG. 2 could be implemented (though all steps in FIG. 2 need not necessarily be performed when performing the steps of FIG. 3).

Figure 4:
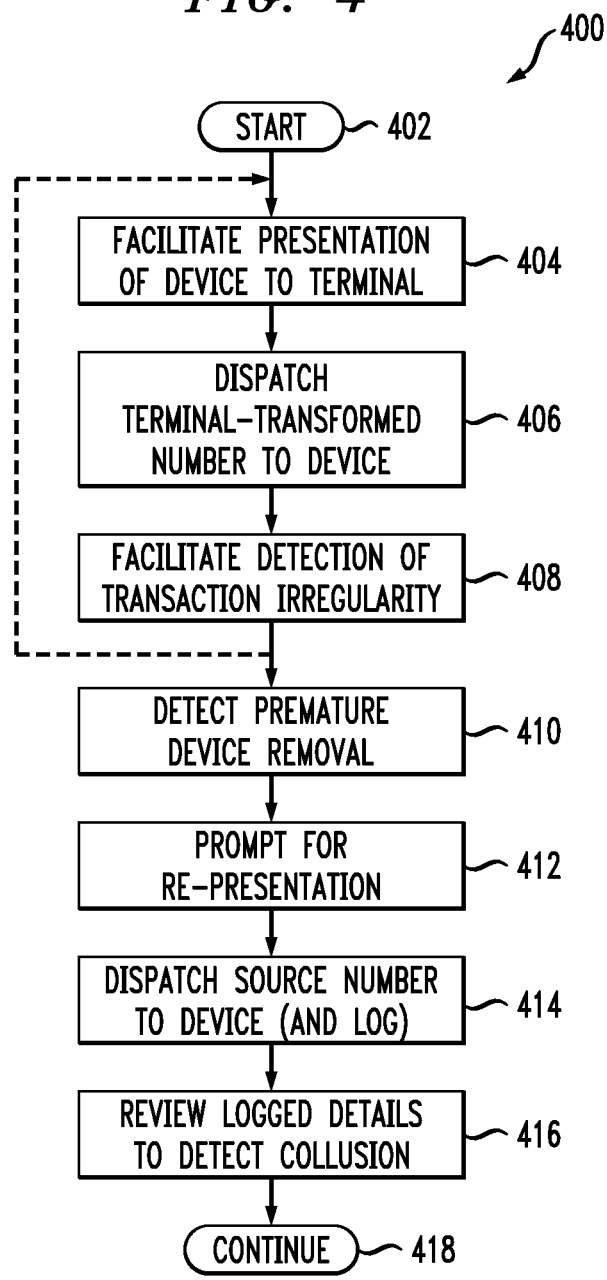
FIG. 4 shows a flow chart of an approach such as that of FIG. 3, but viewed from the terminal side.

FIG. 4 shows a flow chart 400 with exemplary detailed method steps for an approach similar to that of FIG. 3, but viewed from the side of the terminal as opposed to the card or other payment device. After starting at step 402, presentation of a payment device to the terminal is facilitated at step 404. Again, the payment device has an offline balance, and the terminal is either an offline terminal, or an online terminal operating in an offline mode. The presentation is in connection with a putative transaction. At step 406, a terminal-transformed number is dispatched from the terminal to the card or other payment device. As discussed, the terminal-transformed number is a substantially unpredictable source number transformed in accordance with a non-invertable transformation scheme. At step 408, detection of an irregularity with the putative transaction is facilitated. At step 414, responsive to detection of the irregularity, the source number is dispatched to the device, in a form for subsequent transformation by the device.

Optionally, log entries can be made of a kind to be discussed further below. As shown at block 410, premature removal of the payment device from the terminal can be detected. Such premature removal could include, in the case of a contactless device, removal of the device from the area adjacent to the terminal where RF signals could be received and transmitted. At step 412, responsive to the detection of the removal of the device, a prompt could be made to re-present the device to the terminal, in order to facilitate performance of the dispatching step 414. Steps 410, 412, could be conducted, for example, when a customer had removed his or her payment device from the terminal and the putative transaction failed; the customer could be prompted to re-present his or her device so that the amount of the putative transaction could be adjusted to reflect the failure to vend. It will be appreciated that the steps in FIG. 4 can be viewed as representing one possible detailed method of carrying out, from the terminal side, certain steps depicted in FIG. 2 (though all steps in FIG. 2 need not necessarily be performed when performing the steps of FIG. 4).

As noted, different types of logging can be carried out, for example, in connection with step 414. In one aspect of the invention, transaction details associated with requests for dispatching of the source number can be logged, and such log details can be reviewed in order to detect potential collusion between a merchant and a card holder (for example, in connection with fraudulent claims that there was a transaction irregularity when in fact a transaction proceeded normally). Otherwise, unscrupulous individuals could spend amounts in the offline card or device balance multiple times.

In some forms of the present invention, a system could be designed to operate with devices that were not compatible with the transaction adjustment techniques described herein. As indicated by the dotted line, steps such as steps 404, 406, 408 (or indeed any of the steps) can be repeated, for example, for a second payment device (note that in general such repetition could be for a different transaction by a different consumer, and it is not generally intended to suggest that following an unsuccessful vend to one card, there is a role for a second cardholder and second card whereby they conduct a second transaction that somehow relates to the first transaction). The second payment device could be, for example, such a device that was incapable of transaction adjustment via the source number. In such a case, the logging discussed in connection with step 414 could include the logging of transaction data associated with the putative transaction with the second payment device. Such transaction data could include, for example, a record of a payment associated with the putative transaction and a record indicating that the terminal attempted to adjust the putative transaction with the second payment device. Accordingly, in such case, even though the offline balance could not be adjusted on the device at the time of the irregular transaction, the offline balance could be adjusted by re-crediting the customer's account at a later time. Thus, techniques of the present invention could be employed in existing systems and could be made compatible with existing payment schemes that do not permit the transaction correction of the offline balance at the time of the transaction. It will be appreciated that either or both of the types of logging discussed in connection with step 414 could be carried out, or that logging could be omitted from some forms of the invention.

It is presently believed that the techniques described in connection with FIGS. 3 and 4 are preferred in most instances; however, they may require substantial alteration of existing systems. Accordingly, it may be desirable to provide techniques for transaction adjustment that do not require changes to existing cards or other payment devices. In some existing systems, offline terminals and payment devices are configured to exchange different types of requests, which can include, for example, on-line message requests and transaction confirmation requests. Such systems could be adapted to techniques of the present invention by conducting a transaction by first exchanging an on-line message request. Then, if the vend or other transaction proceeded normally, the transaction could be completed by exchanging the transaction confirmation request. However, when there was an irregularity, such as a failed vend, the transaction confirmation request could be held back, such that the transaction would not be completed.

Figure 5:
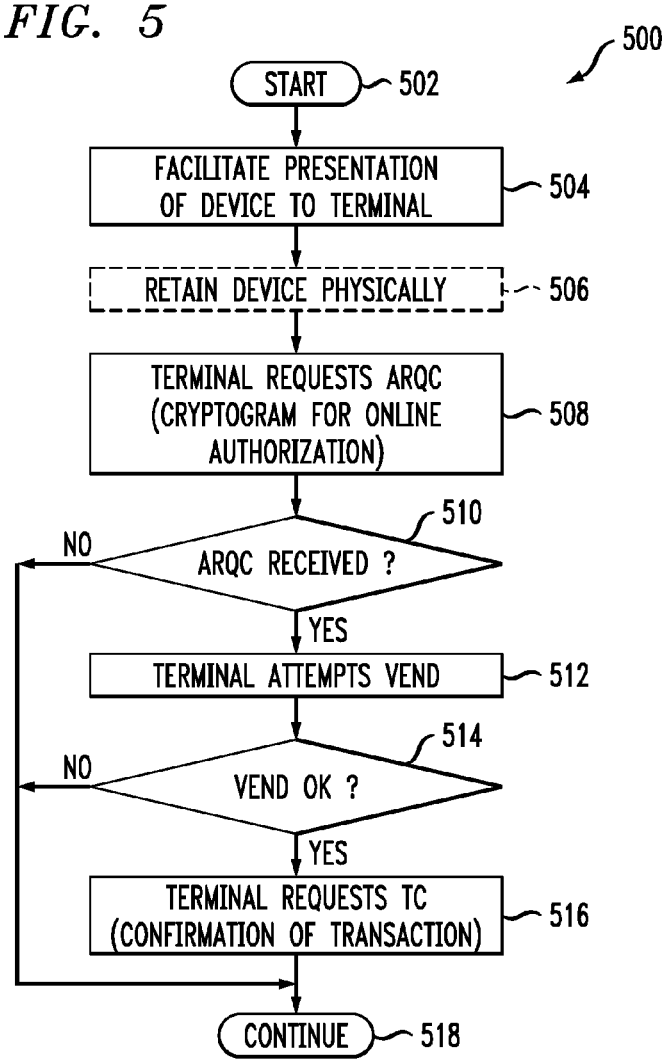
FIG. 5 shows a flow chart of another possible detailed approach to transaction adjustment.

For one specific exemplary method adapted to systems of the kind just described, reference should be had to FIG. 5. This method can also be referred to as the "Late Decrement Method." After beginning at block 502, presentation of the device to the terminal is facilitated at block 504. Optionally, the device can be physically retained within the terminal as suggested at block 506. This physical securing of the device in the terminal can be accomplished to prevent removal of the device from the terminal prior to sending the transaction confirmation request, in a case when no irregularity occurs with the transaction. That is, an unscrupulous person familiar with the operation of the system described could present his or her card or other device to obtain a product and then "rip" the card or other device from the terminal after receiving the product, but before it was possible for the transaction confirmation request to be exchanged. In such case, the person would obtain a product without having the offline balance decremented on his or her card or other payment device.

Still with reference to FIG. 5, in the basic flow, the online message request can be exchanged at block 508, and then if there has been no irregularity, the transaction confirmation request can be exchanged at block 516, to complete the transaction. It will thus be appreciated that the method depicted in FIG. 5 represents one possible manner of implementing certain steps of the method of FIG. 2 (though all steps in FIG. 2 need not necessarily be performed when performing the steps of FIG. 5). Further details regarding the exemplary method of FIG. 5 are presented below within the context of the aforementioned EMV standards.

Additional pertinent exemplary features and characteristics of one or more exemplary embodiments of the present invention will now be discussed. It will be appreciated that, viewed in another way, the aforementioned preferred embodiment in essence involves a terminal creating a secret piece of data when it performs a transaction with a card. This secret piece of data is used, but not revealed. If the terminal wishes to cancel the transaction, it performs a subsequent transaction with the card where it reveals the secret. If the card understands the cancellation or "adjustment" process, it reverses the effects of the last transaction and corrects the offline balance. Further, as noted, the method can be compatible with cards that do not understand the process.

It will be appreciated that the transaction adjustments conducted with techniques of the present invention could include, for example, cancellation of a transaction in a vending machine or other location when the vend fails, as well as reversing a transaction at a vending machine or other point of sale (POS) location for a number of possible reasons. The techniques discussed in connection with FIG. 5 would be useful for transaction cancellation, while the techniques discussed in connection with FIGS. 3 and 4 would be useful for either area. The preferred approach in FIGS. 3 and 4 is believed preferable to the alternative approach of FIG. 5, since the latter is prone to "ripping" which would allow multiple spending, and may not be able to deal with the situation where a card or other device must be re-presented to obtain a refund. The preferred embodiment of FIGS. 3 and 4 may require alteration to existing terminal and/or card applications and is exemplary of one of a class of possible methods that can be employed. It is secure from "ripping" as well as eavesdropping on card-to-terminal communications, and permits transaction adjustment or cancellation even after the card has been removed. Thus, it is generally suitable for transaction reversal. Note that a comparison of the advantages of various exemplary techniques set forth herein is provided below.

It will be appreciated that one possible goal of certain techniques of the present invention is to provide an "offline balance" which makes sense to the holder of the card or other payment device, and in general corresponds to the value of the most recent load less the sum of approved transactions. Thus, declined, cancelled or reversed transactions should not impact the current value of the "offline balance" if it is to make sense to the cardholder.

It will also be appreciated that it is desirable for an offline unattended terminal, such as a vending machine, to cancel a current transaction, and that, further, it is desirable to be able to roll back the results of the last transaction when a card has been removed, in the case of either unattended vending machines or attended (POS) terminals. Further, in some situations, it may be desirable to provide a secure audit trail of terminal activity from terminals that reverse or adjust transactions, so that both acquirers and issuers have confidence that the procedures are not being abused.

With reference to FIG. 5, in current systems conforming to the aforementioned EMV standards, terminals can ask cards for application cryptograms (ACs) of three types, namely, an AAC (application authentication cryptogram associated herein with refusal), a TC (transaction certificate) or an ARQC (authorization request cryptogram associated herein with a request to go online). When an ARQC is requested, as at block 508, the cryptogram that is generated covers the value of the transaction, but because it is an online request for which a decision has not been taken, no change to the card's balance is effected. The terminal, typically a vending machine, will typically not be able to honor the online request because it will be an offline (as defined above) terminal. Thus, it is now in possession of a cryptogram allowing it to seek payment from the issuer. It then ("YES" block of 510; if no ARQC received, processing can proceed to "continue" block 518) instigates the vend of the product, as at block 512. If this vend succeeds ("YES" branch of decision block 514), it then seeks from the card a second AC, indicating that it is unable to go online, and thus seeks a transaction certificate, as at block 516. Processing continues at block 518. If the vend does not proceed acceptably ("NO" branch of block 514), processing can proceed to "continue" block 518.

Note that an example of commercially available credit card, debit card and stored value smart card services with which techniques of the present invention can be employed includes the MASTERCARD M/CHIP® Select standard version 4 services, as promulgated by MasterCard International Incorporated (MASTERCARD M/CHIP is a registered mark of MasterCard International Incorporated, Purchase, N.Y., USA). If the card has been personalized to a profile such as, for example, using the MASTERCARD M/CHIP® Pre-Authorized profile software and/or services, the card will permit this request for a transaction certificate and decrement its offline balance, creating a transaction log entry. It will be appreciated that in such a case, the terminal is in possession of a cryptogram before vending the product, but at this point the card's balance has not yet been affected. If the vend fails, the terminal only needs to close the session with the card. However, once it is known that the vend has succeeded, the terminal asks for a TC to complete the transaction and decrement the card balance.

The issuer will thus receive TCs for completed transactions and ARQCs for transaction where the cardholder pulled the card out of the terminal before the transaction was complete ("ripping"). Thus, an unscrupulous cardholder could pull the card out and spend the offline value multiple times. Thus, it may be prudent to effect slight changes in existing card specifications by only allowing a limited number of such transactions before the card insists on going online (this could be achieved by blocking the card so that only the issuer can unblock it). Alternatively, only a limited number of accumulated aborted values could be allowed before going online. Again, where such changes were not to be implemented, it may be appropriate to limit use of such devices to cases where they can be physically retained in the terminal.

A variation is possible to the scheme just described (also referred to herein as the "Variation Method" and similar to the "Hash Method" except that the latter may be more secure in some instances). The card functionality could be changed slightly such that the value is decremented from the offline balance when the ARQC is requested. If a subsequent TC is requested for the same transaction without going online, the card would not decrement the offline balance again. If the card succeeded in going online, the issuer would manage the situation through issuer host logic. When a vend failed after the ARQC was requested, the card could be re-credited via the terminal requesting an AAC from the card if the vend failed.

By way of restatement, summary, clarification, and provision of additional details, per the EMV specifications, AC stands for "Application Cryptogram" of which there are 3 types: AACs, ARQCs, and TCs. There can be two ACs generated in a transaction by the card—a first and a second AC. Both are done in the same way. The first genAC can result in an AAC (a refusal), an ARQC (a request for online), or a TC (approval of the transaction). The second AC is the result of giving the card the response to the online request (the ARQC) from the first genAC and results in an AAC (refusal) or a TC (approval). In other words in the first attempt, the card may be able to make its mind up to approve or refuse. If it cannot it tries (ARQC) to get its issuer to decide for it and tell it whether to generate an AAC or a TC. Note that in all cases the terminal also has its say. Normally in the 1st genAC the terminal would ask for a TC or an ARQC but it can ask for an AAC if it wants to. There is a precedence here. If the terminal asks for a TC, the card might give it a TC, an ARQC (1st gen only) or an AAC. If the terminal asks for an ARQC (1st gen only), the card will give it an ARQC or an AAC but never a TC. If it asks for an AAC it gets it.

Further details and discussion will now be provided with regard to the preferred method of FIGS. 3 and 4. As noted, the techniques of FIGS. 3 and 4 may require changes to current card and/or terminal specifications. Such techniques can be compatible with terminals and/or cards that do not offer the functionality. Unlike prior techniques, a terminal security module (so-called "purse Secure Application Module" or "Purse SAM") and cryptographic keys are generally not required in the offline terminal. Note, however, that a terminal security module, such as a SAM, may be added to provide an audit trail of terminal activity, but is not needed for the transaction adjustment per se. This offers the benefit of a significant simplification compared to other techniques, as no scheme-wide key management is required (terminal SAM key management need not be in common with card or other payment device). The aforementioned unpredictable source number can be implemented using the terminal Unpredictable Numbers from the aforementioned specification. As in an ordinary transaction, a "get challenge" operation can be performed, even if not directly needed for PIN verification, in order to generate an ICC Unpredictable Number known by the card and the terminal. The TC, when requested, is requested using an Unpredictable Number that is formed from the first four bytes of the SHA-1 hash obtained by hashing the card's ICC Unpredictable Number and a "true" terminal Unpredictable Number together with other transaction data such as the Primary Account Number (PAN), transaction amount, and currency.

If the terminal wishes to cancel, reverse, or adjust the transaction, then it requests an AAC from the card, and supplies the card with the same transaction data (value, currency) and this time supplies the original Unpredictable Number from the previous transaction. The terminal could also indicate that this is an unusual transaction by using an invalid transaction type such as "FF." The card would have cached the Unpredictable Number that was supplied in the previous transaction, and its own previous ICC Unpredictable Number. If, upon recalculation, it obtains the same value, it would reverse the change to the balance by incrementing the balance counter or by decrementing a corresponding cumulative value counter. It would only accept such a transaction if the currency and value matched, and if it is immediately after the transaction to be reversed. If a card does not support the Get Challenge Function, the process would be as just described, but this data item (the ICC Unpredictable Number) would be omitted.

When the AAC is generated, a log entry is made in the Transaction Log. When a reversal is made, there are two possibilities. The original entry could be deleted, or an entry could be made for the AAC. It may be preferable to make an entry for the AAC. A technique to indicate which AAC entry in the log represents a canceled transaction would then be needed, for example, the Cryptogram Information Data (CID) could be employed (the EMV standard defines the CID as a one byte field identifying whether the AC is a TC, ARQC, or an AAC). If the terminal attempts the transaction on a card that does not support the method, the result will be an AAC in the transaction log with the explicit ("invalid") transaction type but not change to the card's balance. Thus, even in such a case, there is evidence that the terminal attempted the adjustment for the transaction, such as a cancellation and/or a reversal.

When the card makes the reversal, checks could be performed. For example, a check could be made that the immediately previous transaction was the one being reversed, that the value and currency matched those in the Transaction Log, and that the Unpredictable Numbers and the previous ICC Unpredictable Number were consistent. In one or more embodiments, it may be desirable to allow these values to differ, that is, to effect a partial reversal, provided that the amount is less than or equal to that of the original transaction.

It will be appreciated that in the exemplary techniques just discussed, because of the pre-computation of the hash value, the cardholder would be unable to reverse a transaction on his or her card without knowledge of the data exchanged between the terminal and the card. In the specification discussed, the Unpredictable Number has $2^{32}$ possible values, and an exhaustive search would be required. Such an attack would be computationally feasible, but impracticable without the ability to eavesdrop. On a contactless interface, it would be possible but expensive. Thus, to mitigate this risk, it may be desirable to place a limit on the value or number of transactions that can be reversed before the card insists on going online. Thus, with respect for example to FIG. 2, block 212 could address a number of transactions that were adjusted, or a value of such transactions, or both.

There is a potential risk of collusion between a merchant and a cardholder. As noted, to mitigate this, in at least the case of high risk terminals, a SAM could be used to audit terminal activity. Note that this is not the same as the SAMs typically used in other techniques for purposes of transaction adjustment, such as in the case of purse schemes, as there is no key management needed in common with the card or other payment device. The function of the SAM in this aspect of the present invention is simply to make it difficult for the merchant to collude in this manner. The SAM is used to generate the Unpredictable Number and hash. If asked for the original hash value to reverse a transaction, it would log the transaction details which would be available for acquirer auditing, as discussed above with regard to block 416. The only cryptographic mechanisms needed in this case would be an integrity check on the details to insure that none were missing. One simple technique to accomplish this is to employ the hash algorithm and a seed value so that no SAM key management is required at all. For audit reasons, the Primary Account Number (PAN) is included in the hash as described above.

The scheme described may be open to a "wedge" device attack if the card and terminal do not both support combined dynamic authentication (CDA). However, in such a case, if an attacker is going to go to the trouble of building a wedge device to attack the transaction, he or she would probably attack the basic transaction and not the refund, as such would be simpler. Accordingly, the issues in such a case would be those associated with dynamic data authentication (DDA) per se, not with the transaction adjustment techniques of the present invention.

In view of the discussions herein, it will be appreciated that techniques of the present invention can permit, if desired, transaction adjustment substantially without the use of a security module and cryptographic keys in the offline terminal. This is to be contrasted with current e-purse schemes where a SAM (cryptographic device, such as a smart card), has to be located in a vending machine. Techniques of the present invention do not require cryptographic methods over and above those already present in EMV terminals, but access to the SHA-1 hashing algorithm is required. As discussed, however, a SAM could be added, or equivalent functions could be built into the terminal to improve auditing (since cryptography per se is not involved). Again, such SAM or other security modules and cryptographic keys are not required for the transaction adjustment per se when using exemplary techniques of the present invention. As noted, cards not supporting the transaction adjustment mechanism could nevertheless be used with terminals according to the present invention, and a transaction log entry for the cancellation could be generated without changing the offline balance, which could be adjusted later by the issuer.

Various features and advantages of the exemplary "Hash," "Late Decrement," and "Variation" methods will now be summarized and contrasted. One potential benefit of the Hash method compared to the Late Decrement method is that in rip-capable terminals there is no danger of rips misleading the balance on a successful vend. This is also a potential benefit of the Variation method so long as wedges cannot be used. If rips and wedge devices are considered a risk then use of CDA is indicated and in this case the Hash method is likely better than the Variation method, because with the Variation method a wedge device could potentially fraudulently reverse the transaction. Furthermore with the Hash method one can even allow the reversal to happen in the following transaction (rather than require it to happen in the same transaction). In this case if the first transaction is eavesdropped (e.g. using a wedge device or contactless interface) then it may become feasible for a fraudster to break the hash (because the fraudster can do so offline before attempting the reversal). However, in practice, there may be no real business case for this attack. In sum, the Hash method is relatively secure against ripping, but, so long as wedges cannot be used, so is the Variation method wherein the transaction is reversed using the 2nd GEN AC if the vend fails.

Figure 6:
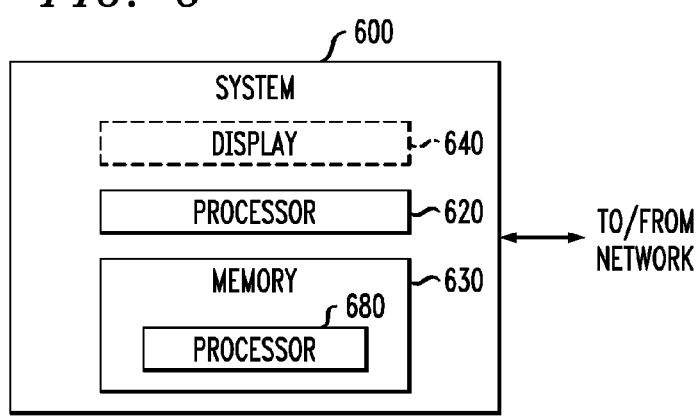
FIG. 6 is a system block diagram of a computer system having applicability to one or more elements of one or more embodiments of the present invention.

The invention can employ hardware and/or software aspects. Software includes but is not limited to firmware, resident software, microcode, etc. Software might be employed, for example, in connection with a terminal 122, 124, 126, 134, 136. Firmware might be employed, for example, in connection with payment devices such as cards 102, 112. FIG. 6 is a block diagram of a system 600 that can implement part or all of one or more aspects or processes of the present invention. As shown in FIG. 6, memory 630 configures the processor 620 (which could correspond, e.g., to processor portions 106, 116) to implement one or more aspects of the methods, steps, and functions disclosed herein (collectively, shown as process 680 in FIG. 6). The memory 630 could be distributed or local and the processor 620 could be distributed or singular. The memory 630 could be implemented as an electrical, magnetic or optical memory, or any combination of these or other types of storage devices (including memory portions as described above with respect to cards 102, 112). It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices; cards might typically not have such displays, but terminals, readers, PDAs and the like might have such displays.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned readers 122, 124, 126, 134, 136 or payment devices such as cards 102, 112 can make use of computer technology with appropriate instructions to implement method steps described herein. By way of further example, a terminal apparatus 122, 124, 126, 134, 136 could include a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card).

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for transaction adjustment, comprising the steps of:
    facilitating presentation of a payment device having an offline balance to an offline terminal in connection with a putative transaction, said transaction comprising a vend having a vend value, wherein:
        said payment device comprises:
            a body portion;
            a payment device memory associated with said body portion and containing said offline balance; and
            at least one payment device processor associated with said body portion and coupled to said memory; and
        said offline terminal comprises:
            a reader module;
            a terminal memory associated with said reader module; and
            at least one terminal processor coupled to said memory;
    facilitating detection of an irregularity with said putative transaction, said irregularity comprising a vend failure;
    adjusting said offline balance, responsive to said detection, said adjusting being carried out, via offline-terminal interaction between said at least one payment device processor and said at least one terminal processor, communicating through said reader module, without the use of a security module and cryptographic keys in said offline terminal, wherein said adjusting comprises refunding said vend value to said offline balance; and
    dispatching, from said offline terminal, a terminal-transformed number, said terminal-transformed number comprising an unpredictable source number transformed in accordance with a non-invertable transformation scheme;
    wherein said adjusting step further comprises dispatching, from said offline terminal, said source number, in a form for subsequent transformation by said payment device.

2. The method of claim 1, further comprising the additional steps of:
    detecting removal of said device from said terminal prior to said dispatching step; and
    prompting for re-presentation of said device to said terminal to facilitate performance of said dispatching step.

3. A method for transaction adjustment, comprising the steps of:
    facilitating presentation of a payment device having an offline balance to an offline terminal in connection with a putative transaction, said transaction comprising a vend having a vend value, wherein:
        said payment device comprises:
            a body portion;
            a payment device memory associated with said body portion and containing said offline balance; and
            at least one payment device processor associated with said body portion and coupled to said memory; and
        said offline terminal comprises:
            a reader module;
            a terminal memory associated with said reader module; and
            at least one terminal processor coupled to said memory;
    facilitating detection of an irregularity with said putative transaction, said irregularity comprising a vend failure; and
    adjusting said offline balance, responsive to said detection, said adjusting being carried out, via offline-terminal interaction between said at least one payment device processor and said at least one terminal processor, communicating through said reader module, without the use of a security module and cryptographic keys in said offline terminal;
    wherein:
    said offline terminal and said payment device are configured to exchange at least an on-line message request and a transaction confirmation request and to complete given transactions with no irregularities by exchanging said on-line message request followed by said transaction confirmation request; and
    said adjusting step comprises refraining from sending said transaction confirmation request in a case when said irregularity has been detected, whereby said putative transaction is not completed;
    further comprising the additional step of physically securing said payment device in said terminal to prevent removal of said device from said terminal prior to sending said transaction confirmation request in a case when no irregularity occurs with said transaction.

4. A method for transaction adjustment, comprising the steps of:
    facilitating presentation of a payment device having an offline balance to an offline terminal in connection with a putative transaction, said transaction comprising a vend having a vend value, wherein:
        said payment device comprises:
            a body portion;
            a payment device memory associated with said body portion and containing said offline balance; and
            at least one payment device processor associated with said body portion and coupled to said memory; and
        said offline terminal comprises:
            a reader module;

a terminal memory associated with said reader module; and
at least one terminal processor coupled to said memory;
facilitating detection of an irregularity with said putative transaction, said irregularity comprising a vend failure; and
adjusting said offline balance, responsive to said detection, said adjusting being carried out, via offline-terminal interaction between said at least one payment device processor and said at least one terminal processor, communicating through said reader module, without the use of a security module and cryptographic keys in said offline terminal;
wherein:
said offline terminal and said payment device are configured to exchange at least an on-line message request and a transaction confirmation request and to complete given transactions with no irregularities by exchanging said on-line message request followed by said transaction confirmation request; and
said adjusting step comprises refraining from sending said transaction confirmation request in a case when said irregularity has been detected, whereby said putative transaction is not completed;
further comprising the additional steps of:
detecting a number of instances of a removal of said device from said terminal prior to sending said transaction confirmation request; and
blocking said device, responsive to said number of instances being at least equal to a predetermined value.

5. A method for transaction adjustment, comprising the steps of:
facilitating presentation of a payment device having an offline balance to an offline terminal in connection with a putative transaction, said transaction comprising a vend having a vend value, wherein:
said payment device comprises:
a body portion;
a payment device memory associated with said body portion and containing said offline balance; and
at least one payment device processor associated with said body portion and coupled to said memory; and
said offline terminal comprises:
a reader module;
a terminal memory associated with said reader module; and
at least one terminal processor coupled to said memory;
facilitating detection of an irregularity with said putative transaction, said irregularity comprising a vend failure;
adjusting said offline balance, responsive to said detection, said adjusting being carried out, via offline-terminal interaction between said at least one payment device processor and said at least one terminal processor, communicating through said reader module, without the use of a security module and cryptographic keys in said offline terminal, wherein said adjusting comprises refunding said vend value to said offline balance;
detecting a number of instances of said putative transactions having said irregularities; and
forcing said device to go on-line prior to further transactions, responsive to said number of instances being at least equal to a predetermined value.

6. A method for transaction adjustment, comprising the steps of:
facilitating presentation of a payment device having an offline balance to an offline terminal in connection with a putative transaction, said transaction comprising a vend having a vend value, wherein:
said payment device comprises:
a body portion;
a payment device memory associated with said body portion and containing said offline balance; and
at least one payment device processor associated with said body portion and coupled to said memory; and
said offline terminal comprises:
a reader module;
a terminal memory associated with said reader module; and
at least one terminal processor coupled to said memory;
dispatching, from said offline terminal, a terminal-transformed number, said terminal-transformed number comprising an unpredictable source number transformed in accordance with a non-invertable transformation scheme;
facilitating detection of an irregularity with said putative transaction, said irregularity comprising a vend failure; and
responsive to said detection of said irregularity, dispatching, from said offline terminal to said payment device, via said reader module, said source number, in a form for subsequent transformation by said payment device to effectuate refund of said vend value to said offline balance without use of a security module and cryptographic keys in said terminal apparatus.

7. The method of claim 6, further comprising the additional steps of:
logging transaction details associated with requests for said dispatching of said source number; and
reviewing said details from said logging step to detect merchant-cardholder collusion.

8. The method of claim 6, further comprising the additional steps of:
repeating said steps of facilitating presentation, dispatching said terminal-transformed number, and facilitating detection, for a second payment device, said second payment device being incapable of transaction adjustment via said source number;
logging transaction data associated with said putative transaction with said second payment device, said transaction data comprising a record of a payment associated with said putative transaction and a record indicating that said terminal attempted to adjust said putative transaction with said second payment device; and
subsequently re-crediting an account of a holder of said payment device for said vend value.

9. A terminal apparatus for interacting with a payment device having an offline balance, said terminal apparatus comprising:
a reader module;
a memory associated with said reader module; and
at least one processor coupled to said memory, said processor being operative to:
dispatch a terminal-transformed number, said terminal-transformed number comprising an unpredictable source number transformed in accordance with a non-invertable transformation scheme;

detect an irregularity with a putative transaction, said putative transaction comprising a vend having a vend value, said irregularity comprising a vend failure; and dispatch said source number, in a form for subsequent transformation by said payment device, responsive to said detection of said irregularity, to effectuate refund of said vend value to the offline balance without use of a security module and cryptographic keys in said terminal apparatus.

\* \* \* \* \*